United States Patent [19]

Pillai et al.

[11] Patent Number: 5,185,135
[45] Date of Patent: Feb. 9, 1993

[54] METHOD OF DEWATERING A WET PROCESS PHOSPHORIC ACID SLURRY

[75] Inventors: Krishnan J. Pillai, Aurora; Lawrence J. Connelly, Oak Lawn, both of Ill.; William K. Gustafson, Sandy, Utah

[73] Assignee: Nalco Chemical Company, Naperville, Ill.

[21] Appl. No.: 743,922

[22] Filed: Aug. 12, 1991

[51] Int. Cl.$^5$ .................... C01B 25/16; B01D 21/01; B03D 3/00; C02F 1/00
[52] U.S. Cl. ................... 423/320; 423/321 R; 210/733
[58] Field of Search .................. 423/320, 321 R; 210/733

[56] References Cited

U.S. PATENT DOCUMENTS

| | | | |
|---|---|---|---|
| 4,705,640 | 11/1987 | Whittaker | 210/733 |
| 4,800,071 | 1/1989 | Kaesler et al. | 423/321 |
| 5,009,873 | 4/1991 | Kerr et al. | 423/320 |

FOREIGN PATENT DOCUMENTS

| | | |
|---|---|---|
| 83304489 | 3/1984 | European Pat. Off. |
| 86302986 | 11/1986 | European Pat. Off. |
| 86302987 | 11/1986 | |
| 89120781 | 6/1990 | European Pat. Off. |

OTHER PUBLICATIONS

"Effect of Shear on Polymer Aided Flocculation of Suspensions", Nicholas D. Sylvester and Mousa P. Toure, Ind. Eng. Chem. Prod. Res. Dev., vol. 17, No. 4, 1978, pp. 347–351.
"Factors Effecting a Loss of Flocculation Activity of Polyacrylamide Solutions: Shear Degradation, Cation Complexation, and Solution Aging", J. M. Henderson and A. D. Wheatley, J. Applied Polymer Science, vol. 33, pp. 669–384 (1987).
"Aging and Loss of Flocculation Activity of Aqueous Polyacrylamide Solutions", W. P. Shyluk and F. S. Stow, Jr., J. Applied Polymer Science, vol. 13, pp. 1023–1036 (1969).
"Coagulation and Flocculation in the Mining Industry", L. J. Connelly and P. F. Richardson, AIChE symposium presentation, Oct. 10, 1984, reprint.
"Coagulation and Flocculation", Nalco Water Handbook, Second Ed., 1988, McGraw-Hill Book Co., pp. 8.3 to 8.23.
"Phosphates, Phorphorus; Fertilizers, Potassium Salts, Natural Organic Fertilizers, Urea", J. Q. Hardesty and L. B. Hein, Riegel's Handbook of Industrial Chemistry, Van Nostrand Reinhold Co., 1974, pp. 537 to 548.
"DeWatering", Kirk Othmer Encyclopedia of Chemical Technology, Supplement vol., pp. 310 to 324, 1984.
Literature Search Report No. 3558, pp. 1–18, Mar. 1991.

Primary Examiner—Gregory A. Heller
Attorney, Agent, or Firm—Joan I. Norek; Robert A. Miller; Joseph B. Barrett

[57] ABSTRACT

A digested slurry from a wet process phosphoric acid production process is dewatered by gravity-assisted vacuum filtration using as a filtration aid an aqueous solution of a polymeric filtraton aid that has been subjected to high shear mixing to enhance the performance of the filtration aid and enhance the filtration.

17 Claims, No Drawings

METHOD OF DEWATERING A WET PROCESS PHOSPHORIC ACID SLURRY

TECHNICAL FIELD OF THE INVENTION

The present invention is in the technical field of solids/liquid separation, and more particularly in the technical field of solids/liquid separation as applied to digested slurry in wet process phosphoric acid production.

BACKGROUND OF THE INVENTION

Phosphorus is an important component of many commercial materials, including fertilizers, detergents, nutrients for animal feeds, corrosion inhibiting chemicals and others. The principal source of phosphorus is natural deposits of calcium phosphate. The calcium phosphate deposits are most commonly converted to industrial useful form by the digestion of such deposits, or phosphate rock, with sulfuric acid. Such digestion converts the calcium phosphate to phosphoric acid and various calcium sulfates, and is generally referred to as the "wet process phosphoric acid" production.

As is described in more detail below, the digestion of phosphate rock takes place at elevated temperatures in an aqueous slurry. Such slurry contains a high concentration of calcium sulfate solids together with other solids present in the phosphate rock. The potential recoverable phosphoric acid is within the liquid phase of such slurry. The separation of such solids from the phosphoric acid-containing liquid phase is a critical step of the process Such solids/liquid separation is accomplished by a filtration process. The filtration process is a highly significant factor in product yield and manufacturing costs. The efficiency of filtration process is dependent upon many factors, including the nature of the solids, the temperature at which filtration is conducted, the concentration of the solids in the material being filtered, the time restrictions, the nature of the liquid phase, and the filter media. Referring to such factors collectively as the "filtration conditions", the filtration conditions met in the wet process phosphoric acid production can be considered extreme.

Thus in wet process phosphoric acid production there is encountered both an extreme need for filtration efficiency and extreme filtration conditions. The filtration is normally the bottle-neck in phosphoric acid production.

Filtration aids, particularly polymeric filtration aids, are often used in industry to enchance filtration processes. The use of polymeric filtration aids in the wet process phosphoric acid production is also well known. The enhancement generally sought from filtration aids is the increase in filtration rate, the minimization or elimination of solids in the filtrate, and the minimization of liquid in the filter cake (retained solids).

In wet process phosphoric acid production the product itself is within the liquid phase, and it is extremely desirable to recover such product in concentrated form. Hence for the wet process phosphoric acid production both enhancing the filtration process and reducing the amount of acid associated with the filter cake (gypsum by-product) are very important.

Polymers are well suited for tailoring to specific needs. Polymers can be varied by their molecular weights, and the type and density of ionic charges or polar groups. Polymers may be nonionic, anionic, cationic or amphoteric. Nonionic polymers, without any ionic charges, may be varied drastically in nature by the type and density of polar groups, usually pendant from the polymer backbone, or even by the presence of significant nonpolar groups, or combinations thereof. Polymers with ionic groups can also contain pendant polar and nonpolar groups which can effect the overall polymer characteristics. Further, the environment in which the polymer is used can effect its characteristics, for instance the suppression of ionic charges in acid or alkaline media rendering the potential ionic groups essentially nonionic in nature.

When used as filtration aids polymers generally must be soluble in the liquid phase, usually water, at the concentration level(s) employed, and hence multiple types of polymer/liquid phase interactions are encountered. Multiple polymer/solids interactions are also encountered, and certain of such interactions may be predominant and/or be sought. When the predominant polymer/solids interaction is the reduction of surface charges on the solids, the polymer is commonly referred to as a coagulant, and is usually cationic in nature. When the predominant polymer/solids interaction is gathering together solids, or floc particles, by bridging from one surface to another, without any substantial surface charge modification, the polymer is commonly referred to as a flocculant, and is usually anionic or nonionic in nature. The role played by a given polymer is not defined, however, solely by its ionic or nonionic nature, particularly in complex solids/liquid separation systems, and other factors, including molecular weight of the polymer, the nature and concentration of the solids, and the nature of the liquid phase may all or in part determine the ultimate interactions and results thereof. Moreover, in dynamic situations, time itself is a highly significant condition that can control, in part, the extent of polymer interactions with both the liquid phase and solids, and hence the impact of the addition of the polymer to the system.

The present invention provides an enhancement to the filtration process, or step, of the wet process phosphoric acid production. Such enhancement concerns not only the generally desired goals of filtration enhancement, but also those particularly desired in wet process phosphoric acid production. The present invention provides a filtration enhancement under the extreme filtration conditions encountered in the wet process phosphoric acid production. The present invention employs polymeric filtration aids which provide the higher degrees of filtration efficiencies that are extremely desired in this important commercial production, while reducing the dilution usually associated with polymer introduction.

DISCLOSURE OF THE INVENTION

The present invention provides a process for the dewatering of a digested slurry from a wet process phosphoric acid production digestion process, in which an aqueous solution of polymeric filtration aid is subjected to high shear mixing before it is added to the digested slurry. The polymeric filtration aid is comprised of at least one polymer having a Reduced Specific Viscosity Value within the range of from about 1 to about 25, and is present in the aqueous solution at a concentration level of from about 0.05 to about 5.0 weight percent. The dewatering is accomplished with gravity-assisted vacuum filtration while the temperature of the slurry remains within the range of from about 63° C. to about 135° C. The dewatering is enhanced over both such a filtration process without any filtration aid and such a filtration process omitting the high shear mixing step.

The present invention also provides a wet process phosphoric acid production process wherein a digested slurry is dosed with an aqueous solution of polymeric filtration aid that has been subjected to high shear mixing. The process involves the digestion of phosphate rock with sulfuric acid at a temperature within the range of from about 70° to about 135° C. to form a digested slurry that contains calcium sulfate crystals and a liquid phase. The liquid phase contains from about 28 to about 42 weight percent soluble $P_2O_5$. The digested slurry, after dosing with the aqueous solution of polymeric filtration aid, is dewatered by gravity-assisted vacuum filtration prior to any substantial drop in the temperature of the slurry from the digestion temperature. The aqueous solution of polymeric filtration aid has a concentration of such polymer of at least about 0.05 percent. The polymer, prior to high shear mixing, has a Reduced Specific Viscosity value of from about 1 to about 25, which is reduced at least about 5 percent by such mixing.

PREFERRED EMBODIMENTS OF THE INVENTION

As noted above, phosphate rock is composed of calcium phosphate and other substances. The precise composition of phosphate rock varies not only with the geographic location of the deposit, but also with location in a given mine. The substances often found in phosphate rock are listed below in Table 1, together with the concentration ranges of such substances that are typically encountered. The phosphate content of phosphate rock is expressed in Table 1 in terms of $P_2O_5$ content. $P_2O_5$ content is the routine manner of expressing phosphorus compound levels in the industry, and it will be used herein for calcium phosphate and phosphoric acid concentrations, and the like, herein at times. To convert the measure of $P_2O_5$ to calcium phosphate (tricalcium phosphate, $Ca_3(PO_4)_2$, also known in the industry as "Bone Phosphate of Lime" or "BPL"), the numerical value is multiplied by the molecular weight ratio of 2.185.

TABLE 1

| Substance | Percentage by Weight Range in Phosphate Rock |
| --- | --- |
| $P_2O_5$ | 28 to 40 |
| F | 1 to 4 |
| $CO_2$ | 1 to 9 |
| $SO_3$ | 0 to 3 |
| $SiO_2$ | 1 to 15 |
| CaO | 29 to 54 |
| $Al_2O_3$ | 0 to 2 |
| $Fe_2O_3$ | 0.1 to 2 |
| MgO | 0.1 to 2 |
| $Na_2O$ | 0 to 2 |

In addition, phosphate rock may also contain amounts of potassium, chlorine, zinc, manganese, arsenic, uranium, chromium, vanadium, and molybdenum. Phosphate rock also routinely contains organic materials. Such organic material can encompass a major portion of the carbon in the $CO_2$ content of phosphate rock listed above.

The content of phosphate rock as listed above in Table 1 is based on phosphate rock in the form in which it is introduced into the digestion step of the wet process phosphoric acid production. Such form of phosphate rock has been subjected to various beneficiation steps to increase the phosphate content, and reduce particle size, from that of the raw calcium phosphate deposit. The terminology "phosphate rock" as used herein refers to the post-beneficiation material, unless expressly indicated otherwise.

The extraneous materials in phosphate rock will be present in the digested slurry in one form or another. Such extraneous materials include organic materials. Organics are present in phosphate rock in the amount of from about 0.2 to about 8 weight percent, based on total weight of phosphate rock. Of such organic material from about 25 to about 30 weight percent will be in solid form in the digested slurry under filtration conditions. Retention of such solid organic material in the filter cake during filtration is one of the multiple goals in the enhancement or improvement of the wet process phosphoric acid production filtration.

The phosphate rock is introduced into the attack cycle (also known as the digestion step, process or tank, and at times, the digestion circuit) of the wet process, wherein it is digested with sulfuric acid to form, or release, phosphoric acid. The digestion or decomposition of calcium phosphate can be broadly expressed by the following reaction process:

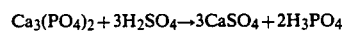
$$Ca_3(PO_4)_2 + 3H_2SO_4 \rightarrow 3CaSO_4 + 2H_3PO_4$$

In the above reaction equation the calcium sulfate by-product is shown as the anhydrite form. Under certain conditions the wet process does produce, at least in part, the anhydrite form of calcium sulfate, and such process is referred to as the anhydrite process. A more common commercial version of the wet process phosphoric acid production, known as the gypsum or dihydrate process, produces the calcium sulfate dihydrate, as follows:

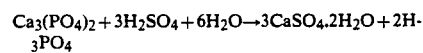
$$Ca_3(PO_4)_2 + 3H_2SO_4 + 6H_2O \rightarrow 3CaSO_4.2H_2O + 2H_3PO_4$$

Under a third set of reaction conditions, referred to as the hemihydrate process, the hemihydrate form of calcium sulfate is produced as a by-product, as follows:

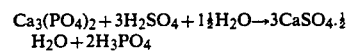
$$Ca_3(PO_4)_2 + 3H_2SO_4 + 1\tfrac{1}{2}H_2O \rightarrow 3CaSO_4.\tfrac{1}{2}H_2O + 2H_3PO_4$$

The above three reaction equations are primary equations denoting the stoichiometry of the various versions of the wet process; the actual reactions occurring during the wet process are, however, more complex.

The calcium sulfate by-product is formed in a crystal matrix form, the various versions of the wet process producing different degrees of hydration in the crystal matrix. The dihydrate process is run at a digestion temperature of from about 70° to about 80° C. under conditions that produce concentrations of $P_2O_5$ in the raw product acid (described and defined more precisely below) of from about 28 to about 32 weight percent. The hemihydrate process is run at a digestion temperature of from about 90° to about 95° C., and sometimes higher, under conditions that produce concentrations of $P_2O_5$ in the raw product acid of from about 38 to about 42 weight percent, or higher. The anhydrite process is run at a digestion temperature of about 130° C. under conditions that produce concentrations of $P_2O_5$ in the raw product acid of about 30 weight percent. At processing conditions not wholly conforming in one or more parameters to a single version of the wet process, the calcium sulfate crystal matrix will contain a greater mixture of hydration degrees than processing conditions within a single version.

In addition to sulfuric acid, as noted in the above reaction equations, phosphoric acid is also added to the digestion circuit in industrial installations. The phosphoric acid assists in breaking down the phosphate rock and in providing low pH conditions. Such phosphoric acid is charged to the digestion circuit generally as acid-containing wash water that is recycled from the filtration step, as discussed below.

Concentrated sulfuric acid is charged to a digestion tank at a rate that controls the exotherm and in an amount ranging from about 100 to about 105 percent of the stoichiometrical requirements. The rate of sulfuric acid addition must also generally be sufficiently slow so as to avoid any contact between the sulfuric acid in concentrated form and the raw phosphate rock. The digestion is accomplished in a slurry of phosphate rock and it is common practice to slurry fresh phosphate rock with the recycled acid-water and some recycled, digested slurry, before fresh sulfuric acid concentrate is added. As digestion proceeds, calcium sulfate crystals form, and the resultant material is the "digested slurry".

The resultant digested slurry may be recycled for the purpose of slurrying fresh phosphate rock, discharged to the filtration installation, or partly recycled and partly discharged for filtration. The digested slurry contains, of course, the conversion products of calcium phosphate digestion, that is, the phosphoric acid and the calcium sulfate solids. The digested slurry also contains the extraneous materials present in the phosphate rock, the recycled materials (the acid-wash water and recycled digested slurry) and any fresh water charged prior to or during digestion.

The filtration installation would be one of several types that have been developed for the wet process phosphoric acid production. There are, however, a number of common features among such various installation, which common features generally are related to the specific requirements of the wet process. In the wet process it is desirable to obtain a raw product acid having a high concentration of phosphoric acid. It is also desirable to remove as much of the phosphoric acid as practical from the filter cake. To accomplish both purposes without deleterious impact on one or the other, an initial filtrate, before the use of any wash water, is recovered and by one means or another is substantially segregated from subsequent filtrates. The subsequent filtrates are desirably of sufficiently high phosphoric acid content so as to be useful as recycled acid-water; hence a countercurrent washing (cake washing) system is often employed. The filtration, at least the initial filtration, is conducted at elevated temperatures, and generally a temperature substantially comparable to the digestion temperature. Given the high solids of the digested slurry, allowing the digested slurry to cool would create undue viscosity problems. The filtration is generally conducted under vacuum.

In more detail, the feed slurry is comprised of from about 30 to about 45 weight percent solids, a major portion of which is comprised of calcium sulfate crystals having a degree(s) of hydration determined by the digestion parameters. The liquid phase of such slurry contains soluble $P_2O_5$, and any filtration unit suitable for the wet process phosphoric acid production will have means for segregating undiluted filtrate initially removed from the slurry from all wash water filtrates. The initial filtrate, or raw product acid, will contain from about 28 to about 42 weight percent $P_2O_5$.

The high solids content of the feed slurry is a very extreme filtration condition, particularly in view of the fact that the desired end product is not in the solids portion, but instead in the liquid phase of the slurry. In fact, the raw product acid's $P_2O_5$ concentration is not sufficiently high for commercial purposes; such raw product acid is further concentrated to provide the actual product acid. Any dilution of the slurry will dilute the raw product acid, thus requiring additional concentration in forming the acid product. Hence unlike many commercial solids/liquid separations, there can be no further dilution of the slurry for the purpose of somewhat relieving the filtration process of the severe high solids condition. Instead, it would be desirable for practical commercial purposes to so enhance the filtration process that that the solids content of the feed slurry, and concommitantly the concentration of $P_2O_5$ in the slurry's liquid phase, can be increased over present practices.

The cake formed, after the slurry is fed to the filter unit and the raw product acid (initial filtrate) is removed, is from about 1.5 to about 4.0 inches high, and more commonly from about 2.0 to about 3.0 inches high, which is a relatively thick filter cake. The thickness of such cake is, of course, due in part to the high solids content of the feed slurry, and the cake thickness may also be considered one of the extreme filtration conditions encountered in the filtration of wet process slurry. The filter cake material itself thus becomes, even in the initial dewatering, the predominant filter media. The material comprising the cake, that is, the solids of the slurry, thus has a predominant role in the filtration mechanisms, including both straining and adsorption.

The filtration type is gravity-assisted vacuum filtration. Although vacuums as high as 26 inches of mercury have been known to be used in the field, and although high vacuums increase the speed of filtration and the amount of liquid phase removed from the solids, practical considerations, such as wear on the equipment, typically limit the vacuum applied to from about 12 to about 18 inches of mercury, with about 14 to 15 inches of mercury being routinely encountered. Such gravity-assisted vacuum filtration techniques are used not only for the initial dewatering of the slurry, but also for the filtration of wash water thereafter applied to the cake. Again, the filtrate from the initial slurry dewatering is always kept segregated from all wash water filtrates; if strict segregation were not followed, the raw product acid would be unnecessarily diluted.

The temperature of the slurry at the point it is fed to the filter unit is about the same as the digestion temperature. For instance, if digestion of the phosphate rock is conducted at about 75° C., a typical feed slurry temperature would be about 74° C., and the raw product acid would be collected at a temperature of about 73° C. The digestion temperature depends on the version of the wet process being conducted. The digestion temperatures range from about 70° to about 135° C. Thus the temperature condition of the initial dewatering will range from about 63° to about 135° C., and more commonly from about 65° to about 134° C. Such elevated temperatures are another severe filtration condition.

The time duration of the initial dewatering, as measured from the initial application of vacuum to the end of the collection of raw product acid, varies from about 12 to about 50, or 60, seconds, and more commonly varies from about 16 to about 20 seconds. Since the phosphoric acid removed from the solids cake with the wash water, while not product acid, is nonetheless not lost soluble $P_2O_5$, lengthening the initial filtration time is generally not practical. As the time of the initial dewatering passes, the amount of filtrate being removed from the cake, per unit time, decreases. Nonetheless, for a given initial dewatering time period it is highly desirable to maximize the filtrate collected, and hence maximize the raw product acid recovered. Moreover, since the filtration process may be a limiting step in the production of phosphoric acid, it is highly desirable in the industry to be able to shorten the initial dewatering time, if such could be done without diminishing the raw acid production target.

Since the phosphoric acid recovered with the wash water is not lost to the process, the filtration of the wash water is an important consideration also. As noted above, elevated temperature of filtration is a severe condition as to many of the interactions occurring during filtration. In the wet process, however, the elevated temperature is considered necessary given the large amounts of calcium sulfate by-product. The elevated temperatures reduce viscosity and increase flow rates. Thus the elevated temperatures are normally maintained throughout the entire filtration cycle, including the filtration of wash water(s). The fresh wash water is generally preheated before introduction into the filtration process. Thus if a slurry is fed to the filtration unit at a temperature of about 74° C., the filtrate at the last filtration station (wash water filtrate) would have a temperature of about 63° C. Thus the total drop in temperature from a digestion temperature of about 75° C. to the completion of the filtration process would be about 12 centigrade degrees. A somewhat greater temperature differential would be expected for slurries digested at higher temperatures. In general, for the dihydrate process, the temperature of the materials (solids and liquid phases) during the entirety of the filtration process would vary from about 55° to about 70° C. Temperatures during filtration for the wet process generally, including all versions, will vary from about 55° to about 125° C.

Generally enhanced filtration seen in the initial slurry dewatering will assure enhanced filtration effects in the subsequent dewaterings where the wash water filtrates are collected. The converse is also generally true; if the initial dewatering is inefficient as to the filtration, the subsequent wash water filtrations will also be inefficient.

As noted above, the feed slurry contains from about 30 to about 45 weight percent solids (including the associated water, such as the hydration water in the calcium sulfate crystals). The liquid phase of the slurry thus comprises from about 55 to about 70 weight percent of the feed slurry. The initial dewatering removes from about 25 to about 45 weight percent of the feed slurry as filtrate, which is from about 45 to about 65 weight percent of the slurry's liquid phase. (Longer time periods for the initial dewatering would of course recover a higher percentage of the slurry's liquid phase at such point, but on an industrial level such prolonged initial dewatering would not be as efficient as the routine practices described herein.) After the initial dewatering, the cake is subjected to a plurality of wash water floodings and dewaterings, discussed more fully with the equipment descriptions. The final cake that remains after such wash water floodings and dewaterings generally has a liquid phase content of from about 25 to about 30 weight percent. While the liquid phase of the final cake contains much less phosphoric acid than, for instance, the initial filtrate, the amount of $P_2O_5$ lost to such final cake often is as high as from about 5 to about 8 weight percent of the $P_2O_5$ produced by the digestion of the phosphate rock.

An industrial wet process phosphoric acid producer may well produce 600 tons per day of $P_2O_5$. A loss of even 0.1 percent of soluble $P_2O_5$ is a loss of about 220 tons of $P_2O_5$ per year. If for instance an installation that has been experiencing a 6.0 weight percent loss of water soluble $P_2O_5$ with the cake discharged from the filtration unit can reduce that loss to even 5.9 weight percent, an additional 220 tons of $P_2O_5$ per year will be produced, and the manufacturing costs savings would be highly significant. Thus both the raw acid product recovery and the subsequent washing/dewatering filtrations are very important to the economics of wet process phosphoric acid production.

The various filtration units that have been commercially developed for the wet process phosphoric acid production, which are discussed below, generally provide all of the features of filtration discussed above, at least within a portion of the ranges noted above. For instance, some of the commercial filter units for the wet process employ to some extent reinforced rubber belts. Such natural rubber has about a 95° C. upper use temperature limit. Hence such a unit may be well suited for the dihydrate process, and possibly the hemihydrate process, but not for the anhydrite process which has very high digestion temperatures. Such various filtration units vary as to means employed for cleaning the filter cloth after cake discharge, and prior to introduction of fresh feed slurry, and thus may differ as to the type of material used for the filter cloth. Suitable filter cloths are made of materials such as polyethylene, polypropylene, polyester, polyacrylonitrile, and the like, with polyethylene being very commonly used. Such filter cloths may be monofilament cloths or multifilament cloths. Multifilament cloths may better prevent the escape of solids into the filtrate, particularly with the first surge of filtrate during the initial dewatering of the slurry, but they have a greater tendency to clog than monofilament cloths. Hence the means for cleaning the filter cloth of a given filter unit may dictate the type of filter cloth used.

A widely used industrial filtration installation for the wet process phosphoric acid production is known as the Bird-Prayon filter, and is commercially available under the tradename of Bird-Prayon. Such units are typically large, circular devices, which continuously revolve, in a horizontal plane, about a center axis. It is comprised of a series of individual trapezoidal filter cells. The individual cells pass various stations as the filter unit revolves. The first station is the slurry feed station, whereat digested slurry (also referred to as feed slurry) is charged to the cell as it passes a stationary slurry feed line. The feed slurry is supported in the cell by a filter cloth flooring, which comprises, together with the solids cake that quickly forms, the filter media. After receiving its charge of feed slurry, the cells and contents are subjected to vacuum, applied from below (filtrate side of the filter media), which vacuum is continued until completion of the "filtration cycle". The filtration cycle includes both the initial slurry dewatering and subsequent dewaterings after additions of wash water. The vacuum is applied at from about 12 to about 18 inches of mercury. The initial filtrate so obtained, prior to the charge of any wash water, will have the highest concentration of phosphoric acid, and in most installations will be the raw phosphoric acid product. (In some installations the first surge of filtrate, which is a fraction of the initial filtrate, will be collected separately from the raw phosphoric acid product fraction because such surge will contain a disproportionately high concentration of solids.) Following these slurry feed and initial slurry dewatering stations are a plurality of cake washing/cake dewatering stations. A counter-current wash water flow is generally employed, as follows. Fresh wash water is added at the last wash station to the solids cake in a given cell and is substantially removed at the next station, the last cake dewatering station. That wash water, the wash water removed at the last dewatering station, is then transferred or routed to the second to the last cake washing station, and removed at the second to the last dewatering station, at which point it is routed further forward up the line, if there are more than two cake washing/cake dewatering station combinations, but not to the initial dewatering station. The filtrate from the initial dewatering station, which is undiluted mother liquor or raw acid product, is segregated from the wash water. The wash water, after being routed through the plurality of cake washing/cake dewatering stations, is then employed as the acid-water recycled to the digestion circuit. After the last cake dewatering station, the cake may be subjected to a drying station, in some instances using a separate vacuum source, after which the individual cell is inverted to discharge the cake and wash the filter cloth. The cell is then, of course, returned to its upright position by the time it again reaches the slurry feed station. In more detail, the slurry feed line and wash water charging lines are disposed above the cells. The lines for removing the initial filtrate and wash water filtrates are below the filter cloth flooring of the cell, and generally lead toward the center of the unit and then to the desired holding tank or the like. An entire revolution, from the slurry feed station to the cake discharge and filter cloth washing stations, may take from about 3 to about 5 minutes. That is, the filter unit is rotating at a speed of from about 3 to about5 minutes per revolution, although such filter units have been operated at speeds as fast as 1.5 minutes per revolution. The slurry is fed to the filter unit at temperatures substantially comparable to the digestion temperature, and the fresh wash water is preheated to like temperatures. Therefore there is only a small temperature drop during the entirety of the filtration cycle. The temperatures during filtration are discussed in more detail above.

Another type of filter unit used in the industry is the UCEGO filter unit, which has a circular, horizontally-disposed table having on its upper part perforated plates, and below this pans to receive filtrates and to discharge them through communicating pipes. The perforated plates form a continuous surface and support a filter cloth. Sections are formed bounded by the filter cloth below, a stationary centered rim, a peripheral rim-forming belt and radially-extending shutters or dams. The individual sections thus are separated from one another by the radial dams. The peripheral belt is held spaced-apart from the rim at the cake discharge and filter cloth washing areas, and thus the sections are open at the periphery of the table at these areas. Vacuum is applied for filtration, and the initial filtrate is kept segregated from wash water filtrates.

A Giorgini filter is a vacuum filter unit of the traveling-pan type developed for the wet process phosphoric acid production. The pans travel along a horizontal elongated path over a longitudinal filtrate trough that extends between the slurry feed and the cake discharge ends of the filter unit. Such trough is under vacuum and is compartmented to keep the filtrates separate. When a pan moves beyond the trough area, vacuum is lost, and the pan travels around a head sprocket, inverting and discharging the cake by gravity. The pans are divided in an upper and lower chamber by a filter cloth. The upper chamber has an open top for receiving the feed slurry and the wash water; the lower chamber serves as a vacuum chamber and is sloped to an outlet spout for carrying away the filtrate. The design provides for rapid pan drainage and filtrate separation, to keep the concentrated raw acid product and the weak acid filtrates separate from each other. A counter-current wash water flow is employed, and heating of the wash water is recommended.

A Landskrona belt filter is also used for the continuous filtration in the wet process phosphoric acid production. It is comprised of an endless belt, horizontally mounted and running between two end pulleys, with raised edges enabling it to hold a cake up to about 4 inches deep. The belt is perforated and supports a filter cloth, which cloth falls away from the belt during the return travel. The cake is discharged by gravitation at the end of the upper horizontal run. The underside of the belt slides over a suction box which applies the vacuum. Adjustable dams are provided on the horizontal belt surface to keep the wash liquids separated. A counter current wash system can be employed as in a pan filter, but one can also keep a continuous layer of liquid between dams. The separation of the cloth filter and belt on the return travel, during which washing thereof occurs, at least minimizes the liquid retained by the cloth or apparatus, preventing dilution of the initial filtrate by such residual liquid.

A Lurgi filter for the wet process phosphoric acid is comprised of two superimposed, endless rubber belts moving between drums over a long, subdivided vacuum box. The lower belt is slotted and has raised edges. The upper belt supports a continuous filter cloth, is perforated and generally has integral side rims. Dams are provided between washing zones. The feed slurry is fed to a distribution zone in the front part of a first suction zone and some settling of the slurry can be allowed before the liquid phase is removed. The first wash zone starts at the point where the filter cake becomes dry on its surface. The filtrates (initial and wash water filtrates) are kept separate. The cake is dried and discharged at the end of the upper run. Countercurrent washing is employed. The filtration method is again a gravity-assisted vacuum filtration.

The raw product acid recovered by the first dewatering of the slurry is concentrated, using evaporators to remove water therefrom. The raw product acid also generally requires further clarification. Solids precipitate from the raw product acid to some extent merely upon cooling, and then again when the acid is concentrated. Normally a series of evaporation and clarification steps are employed. The final $P_2O_5$ concentration desired may vary, although final $P_2O_5$ concentrations of from about 51 to about 54 weight percent are typical. For any final $P_2O_5$ standard, however, the evaporation and clarification steps are a tremendous burden on the overall phosphoric acid production as to not only equipment and the costs of tending same, but also as to energy expended. The introduction of any additive to the slurry that concomitantly in any way dilutes the liquid phase of the slurry must have advantages that are sufficiently great to justify the dilution of the raw acid product, and hence the additional expense required in subsequent concentrations and clarifications.

The polymeric filtration aid is charged to the slurry ahead of the feed outlet located at the slurry feed station of the filtration unit. The filtration aid is charged as an aqueous solution. Since it is desirable to minimize dilution of the slurry, and thus minimize dilution of the product acid, unnecessarily dilute filtration aid solutions are extremely undesirable in the present process. As an illustrative example, if a filtration aid solution having a polymer concentration of 0.05 wt. percent is used to provide a charge of 50 ppm of polymer based on total slurry weight, and the liquid phase of such slurry is about 60 wt. percent of the slurry, such liquid phase would be diluted about 16 to about 17 percent upon addition of the filtration aid. If the concentration of the filtration aid solution were, instead, 0.5 wt. percent, the liquid phase would be diluted only about 1.6 to 1.7 percent, which is a dramatic improvement in dilution minimization. The concentration of the filtration aid solution, however, has limitations. For effective performance the filtration aid polymer must be reasonably distributed throughout the slurry in a short time period. Distribution of polymer per unit time is generally increased when the polymer solution is more dilute and/or when the degree of mixing is increased. With some limitations, distribution of the polymer can also be improved by increasing the time between the charge of the polymer and the filtration. The limitation of most concern on the time of pre-filtration mixing, and on the degree of mixing, is the potential loss of activity of the filtration aid should such mixing be overly prolonged.

Therefore the use of concentrated filter aid solutions is highly desirable to avoid unnecessary dilution of the fluid phase of the slurry, and thus the raw product acid. The filtration aid solution should not, however, be so highly concentrated that polymer distribution, and filter aid performance, is adversely impacted. In addition, while improvements in distribution may be seen with a higher degree of mixing, or a longer pre-filtration mixing of filtration aid and slurry, those parameters have their own performance ceilings, and a given installation may be at, or already beyond, such performance ceilings.

In the process of the present invention, the concentration of the polymeric filtration aid in the aqueous solution, as charged to the slurry, may range from about 0.05 to about 5.0 weight percent actives based on total solution. In preferred embodiment, the minimum concentration of the polymeric filtration aid is 0.15 wt. percent, or 0.2 wt. percent, same basis. In more preferred embodiment, the polymeric filtration aid solution, as charged to the slurry, contains at least 0.4, or 0.5 wt. percent actives. Such various preferred embodiments are at least in some instances not merely a matter of minimizing slurry dilution, but also, contrary to the general proposition that dilution improves performance, a matter of increasing performance in the process of the present invention upon the use of more concentrated filtration aid solutions.

The filtration aid solution is generally charged to the slurry at a point ahead of the slurry feed outlet into the filtration unit. Such point is generally at a location along the conduit that carries the slurry from the digestion circuit to that feed outlet. In the process of the present invention such point of charging the filtration aid solution should be from about 2 to about 60 seconds ahead of the slurry feed outlet, based on speed of the slurry, and in preferred embodiment from about 5 to about 30 seconds ahead of the slurry feed outlet. In more preferred embodiment, the point of charging the filtration aid solution is from about 5 to about 20 seconds ahead of the slurry feed outlet, and in at least some instances the performance of the filtration aid is increased with decreasing time periods of slurry and filtration aid admixing prior to filtration, provided a minimum time period of about 2 or about 4 seconds is observed.

In a typical wet process installation a time period of from about 5 to about 30 seconds ahead of the slurry feed outlet is equivalent to from about 15 to about 100 linear feet ahead of the slurry feed outlet of the filtration unit's feed station.

In general, excess filtration aid charge can be deleterious to the filtration process, while an inadequate charge of filtration aid will not provide the desired performance. For a given filtration aid polymer, to be used in a given wet process phosphoric acid production process, the optimum charge of polymer may be easily determined using, for instance, the "On-site Slurry Filtration Test" described below, or a comparable test method on a laboratory scale. In general, a dosage of from about 10 to about 150 ppm of polymer actives based on total slurry should be an adequate range for the various types of polymeric filtration aids useful for the present invention. In preferred embodiment, the dosage range of polymeric filtration aid is from about 25 to about 100 ppm, same basis. In more preferred embodiment, the dosage range for the polymeric filtration aid is from about 35 to about 75 ppm, same basis.

A good performance from a low dosage of filtration aid is highly advantageous for a number of reasons. In addition to cost considerations, for a given dilution of the polymeric filtration aid a lower dosage of polymer therein translates to a lower level of slurry dilution. Further, a high degree of performance at a low polymer dosage may at least in some instances be indicative of a system with less sensitivity to overdosages of polymer. As noted above, excessive filtration aid dosages can result in a performance decrease. Such performance decrease may take the performance below that of a control, that is, the filtration efficiency as it would be without the addition of a filtration aid. If the charge giving the optimum performance is close to the dosage that would be detrimental to the filtration efficiency, prudence may demand that the dosage rate be lowered from that deemed optimum, to avoid hurting the process by inadvertant variations in the filtration aid charge or the slurry volume to which it is being added. When optimum performance is provided at a low polymer dosage, and such optimum dosage is reasonably less than what would be a detrimental overdosage, it is safer to run the system at, or close to, the optimum dosage.

In the process of the present invention, the use of medium molecular weight acrylamide polymers having up to about 40, or about 50, mole percent of anionic mer units have been found to greatly enhance the filtration, both by decreasing the filtration time and by improving the clarity of the filtrate(s). Such polymers initially have Reduced Specific Viscosities ("RSV") of from about 15 to about 50. As the anionic mer unit, such polymers contain acrylic acid mer units, and those polymers which are acrylamide homopolymers may contain a minor amount of acrylic acid mer units due to hydrolysis of the acrylamide amide group. These polymers are substantially linear and are water soluble at the concentrations employed in preparing aqueous solutions thereof for charging to the slurry. Those having anionic mer units are generally in a water soluble salt form, which typically is the sodium salt form, and hence the acrylic acid mer units are typically sodium acrylate mer units. These polymers are considered to have weight average molecular weights of from about 200,000 to about 40,000,000. Unless expressly stated otherwise, RSV values used herein are RSV values determined in a 1M sodium nitrate aqueous solution at a polymer concentration of 0.045 weight percent.

It is believed that polymers other than the acrylamide ("AcAm") homopolymers and copolymers with acrylic acid ("AA"), described above, may be used in the present invention. (Any mentions herein of ionic-type mer units, such as AA, includes the water soluble salt forms thereof, unless expressly indicated otherwise.) Certain types of polymers, however, can be excluded from consideration for use in the present invention. Significantly cross-linked polymers, and polymers with significant hydrophobic-group contents, would not be sufficiently water soluble to provide aqueous solutions of sufficient concentrations required or desired for use in the present invention. Such types of polymers would most likely, as a class, lack performance activity in the process of the present invention, even if the high dilution required for aqueous solutions of such polymers could be tolerated.

An anionic mer unit such as AA provides pendant carboxylate groups to the polymer. Other sources of pendant carboxylate groups include, without limitation, such mer units as methacrylic acid, ethyl acrylic acid, crotonic acid, itaconic acid, maleic acid, anhydrides of the diacids, and mer units with functional pendant groups that may be converted to ionizable carboxylate groups, such as carboxylic acid esters or acrylamide, both of which may be converted to carboxylic acid (and salts thereof) groups by hydrolysis.

Anionicity may be provided to the polymer by pendant groups other than carboxylic acid. Other ionizable anionic groups include sulfonate, phosphonate, and the like, and a polymer may contain more than one type of anionic group.

Mer units that may provide ionizable sulfonate groups to the anionic polymer include without limitation sulfonated styrene, sulfonated N-substituted (meth)acrylamide, including mer units such as 2-acrylamido, 2-methylpropane sulfonic acid, which is commericially available as a monomer, or mer units that may be converted to sulfonated N-substituted (meth)acrylamide mer units by post-polymerization derivatization techniques such as described in U.S. Pat. Nos. 4,762,894 (Fong et al.) issued Aug. 9, 1988, 4,680,339 (Fong) issued Jul. 14, 1987, 4,795,789 (Fong) issued Jan. 3, 1989, and 4,604,431 (Fong et al.) issued Aug. 5, 1986, all of which are hereby incorporated hereinto by reference.

The preparation of polymers having ionizable phosphonate groups is described in U.S. Pat. No. 4,678,840 (Fong et al.) issued Jul. 7, 1987, incorporated hereinto by reference.

It is also believed that cationic polymers, such as acrylamide polymers having up to about 40, or about 50, mole percent of cationic mer units, may be used in the process of the present invention as the filtration aid. The cationic mer units which might be advantageously incorporated into such an acrylamide polymer include, without limitation, those that are dialkyl amino alkyl (meth)acrylates or (meth)acrylamides, as acid salts or preferably quaternary ammonium salts, such as dimethylaminoethylmethacrylate methyl chloride quaternary ammonium salt ("DMAEM.MCQ"), or diallydimethylammonium chloride ("DADMAC"), and the like. It is also possible that other types of cationic polymers, such as polyethylene imines or polyamine epichlorohydrin polymers, may be used as the filtration aid.

It is believed that nonionic mer units other than acrylamide may be incorporated into the polymeric filtration aid, including of course methacrylamide. It is noted, however, that acrylamide and methacrylamide have pendant polar groups, unlike a nonionic such as ethylene, and if any significant amount of nonionic is to be used in the polymer, for instance in amounts in excess of about 20 mole percent, such nonionic should possess such a polar group. While monomers providing nonionic but polar mer units other than (meth)acrylamide are known, for instance N-vinyl pyrrolidone, such other monomers are not as cost effective as (meth)acrylamide and thus there is little reason to use such materials.

It is also believed that a substantially wholly anionic polymer may be used in the process of the present invention, particularly such an anionic polymer having a relatively low molecular weight, such as an acrylic acid homopolymer having a RSV of from about 1.0 to about 2.5.

It is believed that when the polymeric filtration aid used in the process of the present invention is one having from about 50 to about 100 mole percent of AcAm, or other nonionic, and preferably polar, mer unit, and from about 0 to about 50 mole percent of an ionic mer unit, such polymer should be substantially linear and have a RSV of from about 6 to about 50. In preferred embodiment, when the ionic mer units are cationic, or at least substantially cationic, the polymer is within the lower range of such RSV range, for instance, a polymer having a RSV of from about 7 to about 18. In other preferred embodiment, when the ionic mer units are anionic, or at least substantially anionic, the polymer is within the higher range of such RSV range, for instance, a polymer having a RSV of from about 15 to about 50.

In more broader terms, including polymers that are substantially wholly anionic, the polymer useful for the filtration aid may possibly be within the broad RSV range of from about 1 to about 50. Such RSV range is substantially equivalent to a weight average molecular weight range of from about 200,000 to about 40,000,000 for substantially linear polymers.

In the process of the present invention, an aqueous solution of the polymer to be used as the filtration aid, which polymer is described above, is subjected to high shear mixing prior to charging the filtration aid to the slurry. Such high shear mixing can be done using a wide range of mixing means, including, without limitation, a high speed dispersion blade available from Indco, Inc., of New Albany, Ind., a pipeline mixer available from Greerco Corp., of Hudson, N.H., a Braun mixer, available from Braun Inc., of Lynnfield, Mass., a Hydroshear mixer available from APV Gaulin, of Everett, Mass., and a Dispax Reactor available from Ilca Works, Inc., of Cincinnati, Ohio. The high speed dispersion blade from Indoco, Inc., is run at rim velocities of 2,500 to 5,000 fee per minute. The optimum action is described by the manufacturer as a combination of rotary and radial flow, with intense turbulence at the blade and extending out from the blade about 1 or 2 inches. The Greerco Corp. pipeline mixer and the Ilca Works Dispax Reactor are both in-line continuous high-speed, high-shear homogenizing mixers. Pumping action develops multiple changes of directional flow within a homogenizing head, forcing the mixture through restricted openings where velocity increases. The action can be further described as an intense impact with mechanical and hydraulic shear. The Greerco Corp. Homomixer also subjects material to intense impact, multiple changes in flow direction, sudden acceleration and deceleration, plus high mechanical and hydraulic shear forces. The Braun mixer subjects material to intense turbulence at the blade similar to the action of the Indco, Inc. dispersion blade. The Hydroshear mixer provides shearing action dependent upon the inner shape of the mixer. A premix enters the processing chamber tangentially and spirals inward toward the axis. As the fluid layers move toward the center, the diameter decreases while the height increases, and the fluid velocity increases proportionately. The velocity difference between adjacent concentric layers results in intense shear. The Hydroshear mixer has no moving parts.

The aqueous solution of polymer that is subjected to the high shear mixing preferably should be about the same concentration as that desired when the filtration aid solution is charged to the slurry. If the aqueous solution, when sheared, were more dilute than desired for use, a costly and energy-consuming concentration step would be required, and there is no known advantage to shearing a dilute solution that then requires concentration before use. If the aqueous solution, when sheared, were more concentrated than desired for use, dilution thereof after shearing would generally not be particularly troublesome, but it is generally desired to use the most concentrated polymer solution practical, and there may not be any advantage in shearing the polymer in an even more concentrated solution form. Thus in preferred embodiment, the aqueous solution that is subjected to high shear mixing has a concentration level of polymer of from about 0.05 to about 5.0 weight percent based on total solution. In more preferred embodiment, the minimum concentration of the polymer in such aqueous solution is about 0.15, or 0.2, wt. percent, same basis. In even more preferred embodiment, such aqueous solution contains at least about 0.4, or 0.5, weight percent polymer actives.

The degree of high shear mixing is dependent both on the degree of shear provided by the given mixing means per unit time and the duration of the shear mixing. When using a Braun hand held mixer, or a mixer providing a commensurate degree of shear per unit time, the duration of mixing may vary from about 0.5 to about 10 minutes. When using an in-line static mixer, or a commensurate mixer, the duration of mixing may vary from momentary for the action of once-through mixers to about 45 minutes. The degree of high shear mixing should, in any instance, be sufficient to enhance the performance of the filtration aid at least over the performance of the same filtration aid without high shear mixing. As to filtration aid performance in terms of decreasing the time period of filtration (the time period starting with the onset of vacuum-assisted gravity filtration to the time at which the filter cake is top dry), the high shear mixing should be sufficient to decrease the filtration time at least about 5 percent from the filtration time provided by the use of unsheared filtration aid or no filtration aid, whichever is the shortest time. In preferred embodiment, the high shear mixing should be sufficient to decrease the filtration time at least about 10, or about 15, percent, same basis. Many of the polymers used as filtration aids in the process of the present invention provide filtration enhancement when employed without any high shear mixing and, in such cases, the minimum performance enhancements set out here would be measured not from the filtration without a filter aid, but from a filtration using unsheared polymer as the filtration aid. For instance, as shown in Example 24 below, in comparison to Comparative Example (e) and a control, the process of the present invention reduced filtration time about 20.1 percent in comparison to a filtration using the same polymer, at the same dosage and at the same solution strength, but not subjected to high shear mixing. That same Example 24 is also an example of a decrease in filtration time of 60.3 percent when compared to the control, which was a filtration of the same slurry but without any filtration aid additive. The present invention does not, however, exclude the use of filtration aids that would, without the high shear mixing, increase filtration time, and in those instance the performance in terms of decrease in filtration time are to be measured from filtration without any filtration aid added.

The desired degree of high shear mixing may also be measured or determined in terms of reduction in the RSV of the polymer, and it is believed that as a minimum the high shear mixing should reduce the polymer's RSV at least about 5 percent. The present invention has provided the filtration enhancement desired in terms of decreasing the filtration time when the high shear mixing was of so short a duration that the RSV of the polymer was reduced on the order of only 8 percent. More commonly the reductions in RSV of the polymer by high shear mixing were within the range of from 20 to 40 percent, or even up to almost 50 percent. While useful, the reduction of the polymer's RSV is not believed to be the more reliable measure between reduction of RSV and reduction of filtration time. As seen in Examples 1, 3 and 5 below, for the same polymer an 8 percent reduction in RSV provided about the same filtration performance as a 24.6 percent reduction in RSV, while for the same polymer a medium 14 percent reduction in RSV provided a filtration aid with an even greater filtration enhancement performance.

Another method of determining the desired degree of high shear mixing of the aqueous solution of polymer to be used as a filtration aid is the amount of initial filtrate collected for a given time period of initial dewatering. The process of the present invention is considered to be very effective in enhancing the filtration if the initial filtrate collected is increased at least about 5 percent in comparison to the filtration of the same slurry, for the same initial dewatering time period, with either no filtration aid or the same dosage of the same polymer without the polymer being subjected to high shear agitation, whichever of these two processes produces the most filtrate. As to such comparison using a laboratory scale test, such as a test similar to the "On-site Slurry Filtration Test" described below, the "same slurry" would be aliquots taken from the same slurry sample. As to such comparison in actual industrial use, the "same slurry", as used herein, would be slurry being produced in the same industrial installation in close time periods, for instance within about 1 or 2 hours, without any significant change in the formulations being used in the digestion circuit.

A similar method for determining whether or not the desired degree of high shear mixing of the aqueous solution of polymer has been given involves measuring the fluid phase content of the cake after the initial dewatering. As noted above, the present process is considered to have very effectively enhanced the filtration when the initial filtrate collected, for a given initial dewatering time, is increased 5 percent or more. Similarly the present process is considered very effective when, under the same constant parameters, the fluid phase of the initial cake is reduced at least about 5 percent, in comparison to the same dewatering parameters but either without any filtration aid or with the same polymer, but not subjected to high shear, as a filtration aid, whichever of such two processes provides an initial cake with the least fluid phase.

For either of the above two methods, that is, the methods determining the increase in collected initial filtrate or the decrease in the fluid phase content of the initial cake, the time period of the initial dewatering should not be longer than that routinely used in industry, i.e., a time period in which only from about 45 to about 65 weight percent of the slurry's liquid phase is removed.

Another measure of the efficiency of filtration is the initial clarity of the initial filtrate, or raw acid product. The initial filtrate is recovered at elevated temperatures, as indicated above. Upon cooling, there will inevitably be some degree of precipitation of materials that are soluble at the filtration's elevated temperatures. Thus inevitably the raw acid product will be subjected to one or more clarification steps subsequent to filtration, and typically subsequent to any concentration step(s). Nonetheless it is extremely desirable to minimize the amount of material that passes through the filter medium as solids or colloidal particles at the filtration's elevated temperatures. In particular, it is highly desirable to retain organic material within the filter cake, both during the initial dewatering at which point the raw acid product is collected, and at subsequent wash water dewaterings.

The filtration aid polymers may be supplied in "dry" or powder form, which typically have polymer actives of from about 85 to about 95 weight percent. The routine and herein preferred method of preparing an initial aqueous solution of a dry polymer consists of the following Steps 1 through 5:

Step 1: Charge to an appropriate mixing vessel the required amount of dilution water, preferably at a pH of from about 6 to about 7;

Step 2: Weigh out the required amount of dry polymer for the polymer concentration desired;

Step 3: Slowly add the dry polymer charge into the vessel while providing either mild agitation (when post-preparation high shear mixing will be used) or high shear mixing (which can be done using other than an "in-line" shear device);

Step 4: Upon completion of Step 3, provide mild agitation to the vessel contents for a time period of from about three to about four hours; and Step 5: Upon completion of Step 4, permit the polymer solution to age by standing, without agitation, for a time period of from about 1 to about 5 hours before use.

Mild agitation may be provided by a cage stirrer or the like. High shear mixing at this point can be provided by the Indco, Inc. blade or other sheer devices separate from the line.

The polymer used in the present invention may be supplied in other than dry form. For instance, the polymer may be supplied in aqueous solution, in which instance the only preparation step required would be dilution, if necessary. The polymer may also be supplied as a water-in-oil emulsion, which is a very convenient form that is believed to avoid the potential polymer deterioration problems that exist for aqueous polymer solutions. When supplied as a water-in-oil emulsion, the aqueous solution of polymer is prepared by inverting such emulsion, in the presence of the desired dilution water, with agitation, using a minor amount of an oil-in-water emulsifier, which method is well known to those of average skill in the art. Since such water-in-oil polymer forms have high concentrations of polymers, the oil and emulsifiers that become incorporated into the aqueous solution preparation are negligible and harmless to the process of the present invention.

As indicated above, the general practice is to have the aqueous solution of polymer at a pH of from about 6 to about 7, and of course variations therefrom that would nullify any desired ionicity of the polymer should be avoided.

ON-SITE SLURRY FILTRATION TEST

The "On-site Slurry Filtration Test" is conducted in close proximity to an industrial phosphoric acid plant's slurry feed station, from which the slurry samples are taken. The quantities of the samples taken, the equipment employed, and the like factors are sufficient to provide representative tests, while conveniently being within a laboratory testing scale. The six steps of this Test are set forth below.

(1) Obtain a five gallon sample of slurry from the conduit feeding such slurry at the prayon filter slurry feed station;

(2) Store the five gallon sample in an insulated container to prevent heat loss;

(3) Hand mix the slurry sample and then immediately withdraw a 250 ml. aliquot with a 600 ml. beaker;

(4) Add the desired polymer solution, if any, to such aliquot and admix therewith with a spatula for a specific time period;

(5) Pour the slurry and polymer admixture into a millipore filter unit equipped with a clean sample of filter cloth and under vacuum, while simultaneously starting a stopwatch or like timing device; and (6) Record the time elapsed between introduction of the slurry and polymer admixture into the filter unit and the time at which the top of the filter cake becomes dry.

In order to obtain valid comparative data, each test of series of tests should include a control, to which no polymer solution was added, and such control and the other tests in a series should use slurry aliquots taken from the same five gallon slurry sample. It is also advantageous to use the same type of filter cloth and the same degree of vacuum that is being used at the plant at the time the five gallon slurry sample is taken. When the filter cloth and vacuum are matched to that used in industry for a given slurry, the test results more closely simulate that expected in industrial use. The determination that the filter cake is at the "top-dry" point is easily made visually.

PREPARATION OF TEST POLYMER SOLUTIONS

The polymer solutions used in the On-site Slurry Filtration Test were all prepared from a powder form of the polymer, by Steps 1 to 5 described above, except the solutions used in Comparative Examples (n) through (p), which were usages of a commercial product that is supplied as an aqueous solution, and the dilution of such aqueous solution was in accordance to the supplier's recommendations.

EXAMPLES 1 TO 13 AND COMPARATIVE EXAMPLE (a)

The On-site Slurry Filtration Test was conducted using thirteen condition variants within the present invention (Examples 1 to 13), one treatment outside of the present invention (Comparative Example a) and a "control" without filtration aid treatment. The slurry aliquots used for all such tests were taken from the same five gallon slurry sample. In each test, except the control, the polymer used as the filter aid was a 30/70 mole ratio sodium acrylate/acrylamide copolymer, supplied as a powder having from about 89 to 90 weight percent actives. Such powder form is referred to herein as the "product", and concentrations and dosages are given herein in terms of product, rather than actives, unless expressly stated otherwise. All shearing of filter aid solutions was done with a Braun hand held mixer. For the tests of Examples 1 to 5, a filtration aid aqueous solution was prepared at a concentration of 0.3 wt. percent product and then subjected to shear before charging. In each of Examples 1 to 5 the filter aid solution and slurry aliquot was mixed for 15 seconds before the slurry was filtered. Examples 1 to 5 differ from one another in the shear time to which the filtration aid solution was subjected, varying from 0.5 to 5.0 minutes. Examples 6 to 10 are a set that repeats Examples 1 to 5, except that the filter aid solution and slurry aliquot in each was mixed for twice as long, that is 30 seconds, before the slurry was filtered. Examples 11 to 13 are repeats of Examples 1 to 3 respectively except that the filtration aid solution was prepared in more dilute form, that is, at a concentration of 0.2 wt. percent product rather than 0.3 wt. percent. Comparative Example (a) is a repeat of Examples 11 to 13 except the filtration aid solution was charged to the slurry without being subjected to shearing. In each of these tests, except the control, the filtration aid was charged to the slurry at a dosage of 60 ppm product based on the slurry aliquot prior to the addition of the filtration aid. For Examples 1 to 10 the filtration aid solution dosage was 5 ml., which would dilute the 250 ml. aliquot of slurry about 2 vol. percent. For Examples 11 to 13, the filtration aid solution dosage was 7.5 ml., which would dilute the slurry aliquot to the extent of about 3 volume percent. These test conditions, and the test results in terms of filtration time and percent decrease in filtration time, in comparison to the filtration time of the control, are given in Table 2 below.

TABLE 2

| | 60 ppm of 30/70 Sodium Acrylate/Acrylamide Copolymer Filtration Aid, Braun Mixer | | | | |
|---|---|---|---|---|---|
| | Filtration Aid Solution | | | Slurry Filtration | |
| Example No. | Conc. (wt. %) | Shear Time (min.) | Mix Time (sec.) | Time (sec.) | Percent Decrease |
| control | — | — | 15 | 31.1 | — |
| 1 | 0.3 | 0.5 | 15 | 22.3 | 28.3 |
| 2 | 0.3 | 1.0 | 15 | 21.9 | 29.6 |
| 3 | 0.3 | 2.0 | 15 | 20.2 | 35.0 |
| 4 | 0.3 | 3.0 | 15 | 20.5 | 34.1 |
| 5 | 0.3 | 5.0 | 15 | 21.7 | 30.2 |
| 6 | 0.3 | 0.5 | 30 | 21.8 | 29.9 |
| 7 | 0.3 | 1.0 | 30 | 21.6 | 30.5 |
| 8 | 0.3 | 2.0 | 30 | 21.8 | 29.9 |
| 9 | 0.3 | 3.0 | 30 | 23.3 | 25.1 |
| 10 | 0.3 | 5.0 | 30 | 22.9 | 26.4 |
| 11 | 0.2 | 0.5 | 15 | 23.1 | 25.7 |
| 12 | 0.2 | 1.0 | 15 | 22.0 | 29.3 |
| 13 | 0.2 | 2.0 | 15 | 21.9 | 29.6 |
| Comp. (a) | 0.2 | — | 15 | 28.0 | 10.0 |

EXAMPLES 14 TO 22 AND COMPARATIVE EXAMPLES (b) TO (d)

The On-site Slurry Filtration Test was conducted on nine condition variants within the present invention (Examples 14 to 22), three treatments outside of the present invention (Comparative Examples b, c and d) and a control without filtration aid treatment. The slurry aliquots used for all such tests were taken from the same five gallon slurry sample. The polymer used as a filtration aid was an acrylamide homopolymer supplied in powder form (product) having an actives concentration of from about 89 to 90 weight percent. The shearing of the filtration aid solutions was done with an in-line static mixer. The filtration aid aqueous solution for all tests had a product concentration of 0.5 weight percent. In all tests, including the control except for the inclusion of the filter aid, the slurry and filter aid solution was mixed for 10 seconds before filtration of the slurry. The tests of Examples 14 to 22 differed from one another as to filtration aid dosage (in ppm of product based on slurry before the filtration aid charge) and/or filtration aid solution shearing time. The Comparative Examples b, c and d were repeats of respectively Examples 14, 16 and 18 except the filtration aid solution that was charged to the slurry was not subjected to any shear before such addition. These test conditions and test results, in terms of filtration time and percent decrease in filtration time from that of the control, are set forth below in Table 3.

TABLE 3

| | Polyacrylamide Filtration Aid, In-line Static Mixer | | | | | |
|---|---|---|---|---|---|---|
| | Filtration Aid Solution | | | | Slurry Filtration | |
| Example No. | Conc. (wt. %) | Shear Time (min.) | Dosage (ppm) | Mix Time (sec.) | Time (sec.) | Percent Decrease |
| control | — | — | — | 10 | 26.2 | — |
| (b) | 0.5 | — | 48 | 10 | 35.6 | −35.9 |
| 14 | 0.5 | 15 | 48 | 10 | 18.8 | 28.2 |
| 15 | 0.5 | 35 | 48 | 10 | 19.2 | 26.7 |
| (c) | 0.5 | — | 60 | 10 | 39.4 | −50.4 |
| 16 | 0.5 | 15 | 60 | 10 | 15.2 | 42.0 |
| 17 | 0.5 | 35 | 60 | 10 | 17.5 | 33.2 |
| (d) | 0.5 | — | 72 | 10 | 40.2 | −53.4 |
| 18 | 0.5 | 15 | 72 | 10 | 14.8 | 43.5 |

TABLE 3-continued

| | Polyacrylamide Filtration Aid, In-line Static Mixer | | | | | |
|---|---|---|---|---|---|---|
| | Filtration Aid Solution | | | | Slurry Filtration | |
| | | Shear | | Mix | | |
| Example No. | Conc. (wt. %) | Time (min.) | Dosage (ppm) | Time (sec.) | Time (sec.) | Percent Decrease |
| 19 | 0.5 | 35 | 72 | 10 | 15.8 | 39.7 |
| 20 | 0.5 | 8 | 60 | 10 | 21.2 | 19.1 |
| 21 | 0.5 | 15 | 60 | 10 | 15.8 | 39.7 |
| 22 | 0.5 | 35 | 60 | 10 | 16.2 | 38.2 |

EXAMPLES 23 TO 25 AND COMPARATIVE EXAMPLES (e) TO (j)

The On-site Slurry Filtration Test was conducted on three condition variants within the present invention (Examples 23 to 25), six treatments outside of the present invention (Comparative Examples e to j) and a control without filtration aid treatment. The slurry aliquots used for all such tests were taken from the same five gallon slurry sample. The polymer used as a filtration aid in Examples 23 to 25 is the same polymer used in Examples 14 to 22 above, that is, a polyacrylamide. In each of these Examples the filtration aid solution, of 0.5 wt. percent product concentration, was sheared for 5 minutes using an in-line static mixer before charging to the slurry, and then the slurry and filtration aid solution were mixed for 10 seconds before the slurry was filtered. Examples 23 to 25 differed from one another by the dosage used, which varied from 48 to 60 ppm of product based on slurry before filtration aid addition. Comparative Example (e) is a repeat of Example 24 (having a medium dosage of 54 ppm), except that the filter aid solution was not subjected to shear. The filtration aid polymer of Examples 23 to 25 has a RSV of 16.2 as determined after the filtration aid solution is subjected to the 5 minutes of shear. Comparative Examples (f) to (j) use as a filtration aid a polyacrylamide which has a similar RSV without any shearing, that is, an RSV of 16.0. These test factors and test results are set forth below in Table 4.

TABLE 4

| | Polyacrylamide Filtration Aid, In-line Static Mixer | | | | | |
|---|---|---|---|---|---|---|
| | Filtration Aid Solution | | | | Slurry Filtration | |
| | | Shear | | | | |
| Example No. | Conc. (wt. %) | Time (min.) | Polymer RSV | Dosage (ppm) | Time (sec.) | Percent Decrease |
| control | — | — | — | — | 60.0 | — |
| (e) | 0.5 | — | 21.3 | 54 | 30.0 | 50.0 |
| 23 | 0.5 | 5 | 16.2 | 48 | 24.6 | 59.0 |
| 24 | 0.5 | 5 | 16.2 | 54 | 23.8 | 60.3 |
| 25 | 0.5 | 5 | 16.2 | 60 | 23.9 | 60.2 |
| (f) | 0.5 | — | 16.0 | 48 | 28.1 | 53.2 |
| (g) | 0.5 | — | 16.0 | 54 | 27.0 | 55.0 |
| (h) | 0.5 | — | 16.0 | 60 | 27.5 | 54.2 |
| (i) | 0.5 | — | 16.0 | 60 | 25.4 | 57.7 |
| (j) | 0.5 | — | 16.0 | 60 | 24.9 | 58.5 |

EXAMPLES 26 TO 34

The On-site Slurry Filtration Test was conducted on nine condition variants within the present invention and a control without filtration aid treatment. The polymer used as the filtration aid in Examples 26 to 34 was the same polymer used in Examples 14 to 25 above, prepared as a 0.5 wt. percent (based on product) aqueous filtration aid solution. The filtration aid solution, after shearing, was mixed for 10 seconds with the slurry before the slurry was filtered. Examples 26 to 28 are tests wherein the filtration aid solution was sheared using a Braun hand held mixer for three minutes before charging to the solution; these Examples differed from one another in the dosage charged. Examples 29 to 31, and Examples 32 to 34, are repeats of respectively Examples 26 to 28 except for the shearing. In Examples 29 to 31 the shearing was conducted with an in-line static mixer for a 15 minute time period. In Examples 32 to 34 the shearing was done with an Indco 3" D mixer for a 45 minute time period. The combinations of type of mixers and time of shearing were chosen to be approximately comparable as to the shear received ultimately by the filtration aid solution, based at least in part by the RSV of the polymer of the filtration aid solution after shear. The test conditions and test results are set forth below in Table 5. The RSV after shearing for the filtration aids of Examples 26 to 28 was 14.1. The RSV after shearing for the filtration aids of Examples 29 to 31 was 13.8. The RSV after shearing for the filtration aids of Examples 32 to 34 was 13.9.

TABLE 5

| | Filtration Aid | | | Slurry Filtration | |
|---|---|---|---|---|---|
| Example No. | Conc. (wt. %) | Shear System/min. | Dosage (ppm) | Time (sec.) | Percent Decrease |
| control | — | — | — | 66.0 | — |
| 26 | 0.5 | Braun/3 | 48 | 24.6 | 62.7 |
| 27 | 0.5 | Braun/3 | 54 | 23.6 | 64.2 |
| 28 | 0.5 | Braun/3 | 60 | 23.2 | 64.8 |
| 29 | 0.5 | Static/15 | 48 | 24.6 | 62.7 |
| 30 | 0.5 | Static/15 | 54 | 23.8 | 63.9 |
| 31 | 0.5 | Static/15 | 60 | 23.9 | 63.8 |
| 32 | 0.5 | Indco/45 | 48 | 24.0 | 63.6 |
| 33 | 0.5 | Indco/45 | 54 | 23.7 | 64.1 |
| 34 | 0.5 | Indco/45 | 60 | 23.9 | 63.8 |

EXAMPLES 35 TO 40 AND COMPARATIVE EXAMPLES (k) TO (s)

The On-site Slurry Filtration Test was conducted on six condition variants within the present invention (Examples 35 to 40), nine treatments outside of the present invention (Comparative Examples k to s) and a control without filtration aid treatment. The slurry aliquots used for all such tests were taken from the same five gallon slurry sample. The polymer used in Examples 35 to 40 as a filtration aid is the same polymer used in Examples 14 to 34 above, that is, a homopolymer of acrylamide. That same polymer is also used in Comparative Examples (k) to (m), while the polymer used in Comparative Examples (n) to (p) is a Mannich-type polymer used commercially as a wet process phosphoric acid production filtration aid, which is supplied in aqueous solution form commercially. The polymer used in Comparative Examples (q) to (s) is a commercial product that has at least been proposed for use as a filtration aid in the wet process, and is believed to be an anionic polyacrylamide having an average molecular weight in the range of from 10,000,000 to 15,000,000 and a carboxyl fraction of about 7 percent. The solution strength employed for Examples 35 to 40 and Comparative Examples (k) to (m), which all use the acrylamide homopolymer supplied in 89 to 90 weight percent actives powder form, was 0.5 weight percent based on product (powder). The solution strength employed for Comparative Examples (n) to (p) was 20 weight percent based on product, which product was itself an aqueous solution of unknown actives concentration. Such solution strength, and the dosage, based again on product, was in accordance with the supplier's recommended ranges. The solution strength employed for Comparative Examples (q) to (s) was 0.25 weight percent based on product, which product was in powder form of unknown, but presumably high, actives. Shear was applied to the filtration aids of the Examples, but not the Comparative Examples, either by subjecting the aqueous solution of the polymer to four minutes of shear using a Braun mixer (a shear condition indicated below as "Braun/4") or to fifteen minutes of shear using an inline static mixer (a shear condition indicated below as "Inline/15"). The time for mixing the filtration aid charge and slurry ("Mix Time") was 10 seconds for the Examples and varied for the Comparative Examples, as indicate in Table 6 below. In Table 6 below is also indicated, for each test, the dosage of the filtration aid charge (based on product), the shear condition, and for the filtration, the "Time" of the filtration and the "Percent Decrease" in filtration time as compared to the control.

TABLE 6

| Example No. | Filtration Aid | | | Slurry Filtration | |
|---|---|---|---|---|---|
| | Shear Condition | Dosage (ppm) | Mix Time (sec.) | Time (sec.) | Percent Decrease |
| control | — | — | 20 | 33.1 | — |
| 35 | Braun/4 | 48 | 10 | 20.1 | 39.3 |
| 36 | Braun/4 | 60 | 10 | 18.4 | 44.4 |
| 37 | Braun/4 | 72 | 10 | 20.1 | 39.3 |
| 38 | Inline/15 | 48 | 10 | 19.8 | 40.2 |
| 39 | Inline/15 | 60 | 10 | 17.1 | 48.3 |
| 40 | Inline/15 | 72 | 10 | 16.3 | 50.8 |
| n | — | 480 | 20 | 28.7 | 13.3 |
| o | — | 640 | 20 | 21.2 | 36.0 |
| p | — | 800 | 15 | 19.3 | 41.7 |
| q | — | 60 | 30 | 39.5 | −19.3 |
| r | — | 60 | 45 | 36.5 | −10.3 |
| s | — | 60 | 10 | 35.0 | −5.7 |
| k | — | 48 | 10 | 25.1 | 24.7 |
| l | — | 60 | 10 | 20.1 | 39.3 |
| m | — | 72 | 10 | 22.0 | 33.5 |

The RSV values for the filtration aids of the Examples and some of the Comparative Examples that are not indicated specifically in the descriptions thereof above are set forth below in Table 7.

TABLE 7

| Examples or Comparative Examples Nos. | Filtration Aid RSV |
|---|---|
| 1, 6, 11 | 19.4 |
| 2, 7, 12 | 18.7 |
| 3, 8, 13 | 18.2 |
| 4, 9 | 17.1 |
| 5, 10 | 15.9 |
| 14, 16, 18, 21 | 13.8 |
| 15, 17, 19, 22 | 11.1 |
| 20 | 16.2 |
| 35, 36, 37 | 14.0 |
| 38, 39, 40 | 13.8 |
| (a) | 22.1 |
| (b), (c), (d), (k), (l), (m) | 21.3 |

INDUSTRIAL APPLICABILITY OF THE INVENTION

The present invention is applicable to the wet process phosphoric acid production industry.

We claim:

1. A process for the dewatering of a digested slurry from a wet process phosphoric acid production digestion process comprising, in sequence:
    subjecting an aqueous solution of polymeric filtration aid to sufficient high shear mixing to enhance the performance of said polymeric filtration aid,
    wherein said polymeric filtration aid is comprised of at least one polymer having a Reduced Specific Viscosity value within the range of from about 1 to 50 prior to said high shear mixing and being comprised of from about 50 to about 100 mole percent of nonionic polar mer units and from about 0 to about 50 mole percent of ionic mer units, and
    wherein said aqueous solution has a concentration of said polymer filtration aid of from about 0.05 to about 5.0 weight percent;
    then adding said aqueous solution of polymeric filtration aid of said digested slurry in an amount sufficient to enhance a subsequent vacuum filtration of said digested slurry; and
    then subjecting said digested slurry disposed with said polymeric filtration aid to said gravity-assisted vacuum filtration,
    wherein the temperature of said digested slurry at all times from the time said aqueous solution of polymeric filtration aid is added to said digested slurry through the time of said gravity-assisted vacuum filtration is within the range of from about 63° C. to about 135° C., and
    wherein said gravity-assisted vacuum filtration enhancement is an increase of the ratio of filtrate volume per gravity-assisted vacuum filtration time.

2. The process of claim 1 wherein said nonionic polar mer units are acrylamide mer units and said ionic mer units are acrylic acid mer units, or water soluble salts thereof, and said Reduced Specific Viscosity value is from about 15 to about 50.

3. The process of claim 1 wherein said digested slurry is comprised of from about 55 to about 70 weight percent of a liquid phase and from about 30 to about 45 weight percent of solids at the time of said polymeric filtration aid addition to said digested slurry, and wherein said gravity-assisted vacuum filtration separates from about 25 to about 45 weight percent of said slurry as filtrate.

4. The process of claim 1 wherein the time duration of said gravity-assisted filtration is within the range of from about 12 to about 60 seconds, and during said gravity-assisted filtration time a filter cake forms to a height of from about 1.5 to about 4.0 inches.

5. The process of claim 1 wherein said aqueous solution of said polymeric filtration aid is added to said slurry in an amount to provide a dose of said polymeric filtration aid of from about 10 to about 150 ppm of polymer actives based on total weight of slurry.

6. The process of claim 1 wherein the time duration of said gravity-assisted filtration is within the range of from about 12 to about 60 seconds and said high shear mixing is sufficient to decrease said duration time of said gravity-assisted vacuum filtration required to produce a given amount of filtrate 5 percent in comparison to the time for a like filtration either without said addition of said polymeric filtration aid or with a like dosage of said polymeric filtration aid without said high shear mixing, whichever time is the less.

7. A wet process phosphoric acid production process, wherein phosphate rock is digested with sulfuric acid at a temperature within the range of from about 60° to about 135° C. to form a digested slurry containing calcium sulfate crystals and a liquid phase, said liquid phase containing from about 28 to about 42 weight percent soluble $P_2O_5$, and wherein said digested slurry is dewatered by gravity-assisted vacuum filtration prior to any substantial drop in the temperature of said digested slurry from said digestion temperature, characterized in that:

said digested slurry is dosed with an aqueous solution of polymeric filtration aid at a point ahead of said dewatering, wherein said digested slurry is comprised of from about 55 to about 70 weight percent of said liquid phase and from about 30 to about 45 weight percent of solids at the time said digested slurry is dosed with said aqueous solution of polymeric filtration aid, wherein said aqueous solution of polymeric filtration aid is prepared by forming an aqueous solution of a filtration aid polymer at a concentration of at least about 0.15 weight percent, said filtration aid polymer having a Reduced Specific Viscosity value of from about 1 to about 50 and being comprised of from about 50 to about 100 mole percent of nonionic polar mer units and from about 0 to about 50 mole percent of ionic mer units, and then subjecting said aqueous solution of polymeric filtration aid to high shear mixing in sufficient degree to reduce said Reduced Specific Viscosity value of said filtration aid polymer at least five percent, and whereby said gravity-assisted vacuum filtration is enhanced by an increase of the ratio of filtrate volume per gravity-assisted vacuum filtration time.

8. The process of claim 7 wherein said aqueous solution of said polymeric filtration aid is added to said digested slurry in an amount sufficient to provide a dose of said filtration aid polymer based on total weight of slurry of from about 10 to about 150 ppm.

9. The process of claim 7 wherein said aqueous solution of said polymeric filtration aid is added to said digested slurry in an amount sufficient to enhance said gravity-assisted filtration by increasing said ratio of filtrate volume per gravity-assisted vacuum filtration time by at least 5 percent when the gravity-assisted vacuum filtration has a time duration of no more than about 60 seconds.

10. The process of claim 7 wherein said concentration of said filtration aid polymer in said aqueous solution of polymeric filtration aid is at least about 0.4 weight percent.

11. The process of claim 7 wherein said gravity-assisted filtration is conducted under a degree of vacuum of at least 12 inches of mercury, and wherein during said gravity-assisted filtration a cake of calcium sulfate crystals forms to a height of at least about 1.5 inches.

12. The process of claim 7 wherein said filtration aid polymer has a Reduced Specific Viscosity value prior to being subjected to said high shear mixing of from about 6 to about 50.

13. The process of claim 7 wherein said filtration aid polymer has a Reduced Specific Viscosity value prior to being subjected to said high shear mixing of from about 15 to about 50, and wherein said ionic mer units are substantially anionic mer units.

14. The process of claim 7 wherein said filtration aid polymer has a Reduced Specific Viscosity value prior to being subjected to said high shear mixing of from about 7 to about 18, and wherein said ionic mer units are substantially cationic mer units.

15. The process of claim 8 wherein said aqueous solution of said polymeric filtration aid is added to said digested slurry in an amount sufficient to provide a dose of said filtration aid polymer based on total weight of slurry of from about 25 to about 100 ppm.

16. The process of claim 13 wherein said filtration aid polymer is substantially a homopolymer of acrylamide.

17. The process of claim 13 wherein said filtration aid polymer is comprised of from about 60 to about 100 mole percent of acrylamide units and from about 0 to about 40 mole percent of acrylic acid mer units and water-soluble salts thereof.

* * * * *

UNITED STATES PATENT AND TRADEMARK OFFICE
CERTIFICATE OF CORRECTION

PATENT NO. : 5,185,135
DATED : February 9, 1993
INVENTOR(S) : K.J. Pillai, L.J. Connelly, and W. K. Gustafson It is certified that error appears in the above-identified patent and that said Letters Patent is hereby corrected as shown below:

In column 24, line 18, which is line 18 of Claim 1, after "aid" delete "of" and substitute therefor -- to --.

In column 24, line 21, which is line 21 of Claim 1, delete "disposed" and substitute therefor -- dosed --.

Signed and Sealed this

Sixteenth Day of November, 1993

Attest:

BRUCE LEHMAN

*Attesting Officer*  *Commissioner of Patents and Trademarks*